United States Patent [19]
Hese et al.

[11] Patent Number: 5,139,712
[45] Date of Patent: Aug. 18, 1992

[54] METHOD OF PRODUCING MICROFILTRATION MEMBRANES FROM AROMATIC POLYAMIDES

[75] Inventors: Nils Hese, Bad Kreuznach; Horst Perl, Göttingen; Artur Michalski, Gau-Algesheim, all of Fed. Rep. of Germany

[73] Assignee: Seitz-Filter-Werke Theo & Geo Seitz/GmbH & Co., Bad Kreuznach, Fed. Rep. of Germany

[21] Appl. No.: 644,337

[22] Filed: Jan. 22, 1991

[30] Foreign Application Priority Data

Jan. 27, 1990 [DE] Fed. Rep. of Germany ....... 4002386

[51] Int. Cl.$^5$ .............................................. B29C 67/20
[52] U.S. Cl. ...................................... 264/41; 264/216; 264/232; 264/340; 210/500.38
[58] Field of Search ................. 264/41, 216, 232, 340; 210/500.38

[56] References Cited

U.S. PATENT DOCUMENTS 3,993,625 11/1976 Kurihara et al. ............... 210/500.33
4,229,291 10/1980 Walch et al. ........................ 521/185
4,567,009 1/1986 Badenhop et al. ..................... 264/41

FOREIGN PATENT DOCUMENTS 3220376 12/1983 Fed. Rep. of Germany .

Primary Examiner—Hubert C. Lorin
Attorney, Agent, or Firm—H. Gibner Lehmann; K. Gibner Lehmann

[57] ABSTRACT

A process for the manufacture of microfiltration membranes from aromatic polyamides, of which the pore sizes are between 0.05 and 10 μm. A copolymer of isophthalic acid and m-phenylenediamine is dissolved in a solvent mixture of dimethylacetamide and dimethylformamide in the presence of alkali or alkaline earth chlorides and polyethyleneglycol. This solution is produced without the addition of water and is subsequently poured out onto a smooth surface formed of chemically inert material with the formation of the membranes. The water that is required as the precipitation agent, is only added to the poured-out solution by means of the air humidity. The relative air humidity is increased from 30% to 100% during formation of the membranes.

7 Claims, No Drawings

METHOD OF PRODUCING MICROFILTRATION MEMBRANES FROM AROMATIC POLYAMIDES

CROSS REFERENCES TO RELATED APPLICATIONS

The present application claims priority under 35 USC 119, of West German application No. P 40 02 386.9-44 filed Jan. 27, 1990, entitled "Verfahren zur Herstellung von Mikrofiltrationsmembranen aus aromatischen Polyamiden".

STATEMENT AS TO RIGHTS TO INVENTIONS MADE UNDER FEDERALLY-SPONSORED RESEARCH AND DEVELOPMENT.

Research and development of the present invention and application have not been Federally-sponsored, and no rights are given under any Federal program.

BACKGROUND OF THE INVENTION

1. Field of the Invention

This invention relates to a process for the manufacture of microfiltration membranes with pore sizes of from 0.05 to 10 um. by dissolving a copolymer of isophthalic acid and m-phenylenediamine in a solvent mixture of dimethylacetamide and dimethylformamide in the presence of alkali or alkaline earth chlorides and ethyleneglycol, and pouring out the solution onto a smooth surface formed of chemically inert material with the formation of the membrane, a relative air humidity being maintained.

2. Description of the Related Art Including Information Disclosed Under 37 CFR §§1.97-1.99

A process of the initially-mentioned type is disclosed in DE-PS 32 20 376. In the case of this known process the desired pore size of the membranes is adjusted by the proportion of solvent used, at least two of the solvents known as dimethylacetamide, dimethylformamide or N-methylpyrrolidone being used. The maximum content for each individual solvent is 80% of the total content of solvents.

Furthermore, in accordance with this known process, it is extremely important to add water with 1 to 4 parts per weight of the solution and 10 to 25 parts by weight of a polyvalent alcohol and/or water as a structure-loosening additive. Methyleneglycol or ethyleneglycol are used as polyvalent alcohols. In this connection it has proved to be advantageous to add already to the aforementioned alcohols the amount of water, or, even better, the corresponding solvents, dimethylacetamide, dimethylformamide or N-methylpyrrolidone which are used to dilute the polyamide solution in order to avoid irreversible precipitation.

When these known processes are used it has been shown that membranes with a pore size of from 0.05 um. to 10 um. can be produced but that in particular membranes with a pore size between 0.05 and 0.65 um. cannot always be produced in a reproducible manner.

SUMMARY OF THE INVENTION

It is therefore the object of the present invention to modify the known process in such a way that the membranes with the desired pore size, in particular in the vicinity of from 0.05 um. to 0.65 um. can be produced in a reproducible manner. This object is achieved by the characterizing features of claim 1.

It has unexpectedly been shown that the predetermined values in relation to the pore size of the membranes to be attained may be adhered to almost exactly if the addition of water to the solution or to the polyvalent alcohols is totally dispensed with, and if the water which is still required as the precipitation agent for the poured out solution is only supplied by means of the air humidity. DE-PS 32 20 376 discloses that the degree of fineness of the filter membranes to be produced depends to a large extent on the prevailing relative air humidity, which, according to DE-PS 32 20 376, is to be maintained between 50% and 90%. It has, however, been shown that this relation is only applicable if the polyamide solution is water-free, apart from the slight amounts of water present in any case in the solvents, since presumably this proportion of water likewise exerts a considerable influence on the formation of the pore size.

In accordance with DE-PS 32 20 376 the air humidity is maintained at a constant value in the region of from 50% to 90% of relative air humidity. It has, however, emerged that when water is supplied solely by means of relative air humidity it is unfavorable to maintain the relative air humidity constant.

It has been shown by the present invention that it is advantageous if the air humidity is varied during the formation of the membranes. Advantageously the air humidity is increased from a low value to a high value. In this connection it is significant that the initial value is considerably lower than 50% relative air humidity. Preferably the initial relative air humidity is approximately 30% and this is then increased up to 100% (water vapor). In order to obtain membranes with pore sizes in the region of from 0.05 um. to 10 um. it has proved to be advantageous if the solvent ratio of dimethylacetamide to dimethylformamide is set at approximately from 1:5.7 to 5.7:1.

Lithium chloride with a proportion of 20% to 40% by weight in relation to the polymer content, preferably with a content of 35% by weight is used as the alkali chloride.

The proportion of copolymer used is 10% to 15% by weight and preferably 12% to 15% by weight.

The proportion of ethyleneglycol is between 5% and 20% by weight, preferably 10% by weight in relation to the total solution. Even if the proportion of copolymer, lithium chloride and ethyleneglycol, is varied within the limits indicated, the pore size can be adjusted by varying the ratio of dimethylacetamide to dimethylformamide.

The process of the invention for producing the membranes is simplified with respect to the prior art in that the solution is produced by employing a simultaneous addition of all of the components. This is possible since only dimethylacetamide and dimethylformamide are used as solvents and since the addition of water in liquid form, which hitherto had to be mixed with a given amount of dimethylacetamide before being added to the solution, is now dispensed with. With all of the components having been added to each other, the solution is agitated and subsequently poured out. A non-solvent is not required for the subsequent gelling process.

After such above pouring out of the components, water is thereafter immediately supplied by means of the relative air humidity, this being varied between 30% and 100%. The precipitated membrane is subsequently led through an extraction bath and finally subjected to a drying process.

Other features and advantages will hereinafter appear.

DESCRIPTION OF THE PREFERRED EMBODIMENTS

In the following paragraphs, two embodiments will be described.

EXAMPLE 1

A solution of 39 g. dimethylformamide, 10 g. dimethylacetamide, 5.27 g. lithium chloride and 15 g. of a copolymer of m-phenylenediamine and isophthalic acid is produced. An additional solvent with structure-loosening additives, consisting of 16.78 g. dimethylformamide, 3.94 g. dimethylacetamide and 10 g. ethyleneglycol is added to the solution. It is also possible to add the 16.78 g. dimethylformamide and 3.94 g. dimethylacetamide to the 39 g. or 10 g. of solvent instead of producing an additional solvent, and to add the ethyleneglycol directly to the other components, lithium chloride and the copolymer. As a result of thorough agitation, the solution is homogenized and subsequently poured out onto an inert smooth surface with a layer thickness of 100 um. to 300 um. The poured-out solution is subjected to relative air humidity within the limits of 30% to 100%. Subsequently the precipitated membrane is guided through an extraction bath and subsequently subjected to a drying process.

Membranes with a thickness of 100 um. to 200 um. are produced. The bubble point is 4.8 bars, and the water flow rate at 25° C. and 0.9 bars vacuum pressure is 8.57 ml. cm.$^{-2}$ min.$^{-1}$.

EXAMPLE 2

A solution of 10 g. dimethylformamide, 39 g. dimethylacetamide, 5.27 g. lithium chloride and 15 g. copolymer of m-phenylenediamine and isophthalic acid is produced. A solution of 16.78 g. dimethylacetamide, 3.94 g. dimethylformamide and 10 g. ethyleneglycol is added as an additional solvent with a structure-loosening additive. In a similar manner as Example 1, the components of the additional solvent can be added directly to the initial solution. The method of production is the same as that described in Example 1.

Membranes with a thickness of 100 um. to 200 um., of which the bubble point is 0.9 bars, are produced. The water flow rate at 25° C. is on the order of approximately 160 ml. cm.$^{-2}$ min.$^{-1}$.

Variations and modifications are possible without departing from the spirit of the invention.

Each and every one of the appended claims defines an aspect of the invention which is separate and distinct from all others, and accordingly it is intended that each claim be treated in this manner when examined in the light of the prior art in any determination of novelty or validity.

What is claimed is:

1. Process for the production of microfiltration membranes with pore sizes of from 0.05 to 10 um. by dissolving a copolymer of isophthalic acid and m-phenylenediamine in a mixture of solvents of dimethylacetamide and dimethylformamide in the presence of alkali or alkaline earth chlorides and ethyleneglycol, pouring out the solution onto a smooth surface formed of chemically inert material with the membrane being formed, a relative air humidity being maintained, characterized in that the solution is produced without the addition of water, and that water is only supplied to the poured out solution by means of the air humidity, the relative air humidity being increased from substantially 30% to substantially 100% during formation of the membranes.

2. Process according to claim 1, characterized in that in order to adjust the pore size, the proportion of one of the two solvents is varied in the range of from 50% to 85% of the total content of solvent, whilst the proportion of copolymer, ethyleneglycol and alkali or alkaline earth chloride, is maintained constant.

3. Process according to claim 1, characterized in that the copolymer is added at a proportion of from 10% to 15% by weight.

4. Process according to claim 3, characterized in that the proportion of copolymer is between 12% and 15% by weight.

5. Process according to claim 1, characterized in that lithium chloride at a proportion of from 20% to 50% by weight in relation to the polymer content, is added as the alkali chloride.

6. Process according to claim 5, characterized in that the lithium chloride content is 35% by weight in relation to the polymer content.

7. Process according to claim 6, characterized in that the solution is produced by adding all the components simultaneously.

* * * * *